WILLIAM W. BRIGGS.
Animal Traps.
No. 116,017. Patented June 20, 1871.
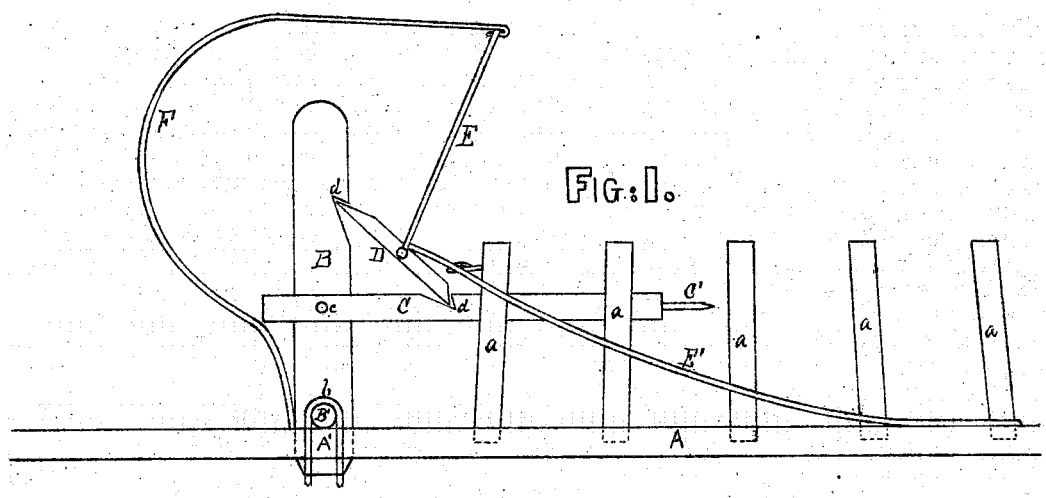
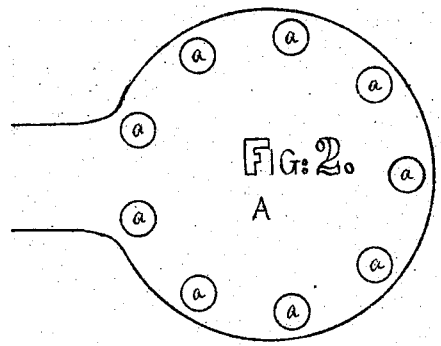
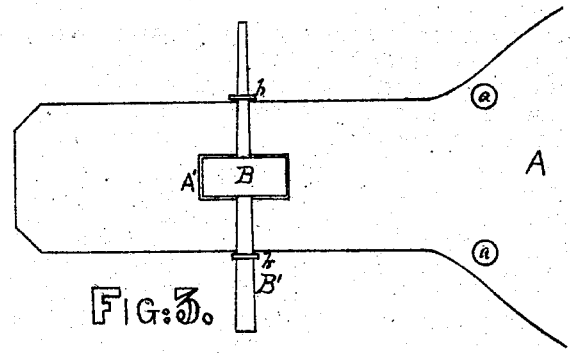
Witnesses.
Edwin James
Alf. Holmead Jr.
Inventor.
William W. Brigg.
per J. E. T. Holmead
Attorney.

UNITED STATES PATENT OFFICE.

WILLIAM W. BRIGG, OF HOME, TENNESSEE.

IMPROVEMENT IN ANIMAL-TRAPS.

Specification forming part of Letters Patent No. 116,017, dated June 20, 1871; antedated June 16, 1871.

*To all whom it may concern:*

Be it known that I, WILLIAM W. BRIGG, of Home, in the county of Greene and State of Tennessee, have invented certain new and useful Improvements in Animal-Traps; and I do hereby declare that the following is a full, clear, and exact description of the same, reference being had to the accompanying drawing and to the letters of reference marked thereon making part of this specification, in which—

Figure 1 is a side view of the trap. Fig. 2 is a top view of the yard. Fig. 3 is a top view of the lip, stud, and anchor-pin or rod.

I so connect the trigger or trap-lever and the main stud that while the free movement of the former is allowed it shall still, at the same time, be firmly bolted to the stud. The lever and stud are each provided with the usual mortised angular catch to receive and retain the latch.

My invention consists in securing the stud and trigger or trap-lever when thus connected in a portable yard, consisting of a thin base-plate or board surrounded by a series of rods or pickets. The latch is connected with a spring by means of a cord, the free end of which is provided with a noose or running knot. When the trap is set this noose encircles the rods or pickets that inclose the yard.

While I am aware that spring and latch traps of various kinds have long been used, still I believe that, owing to the cheapness, durability, and entire effectiveness of the combination of parts hereinafter described, and which constitute my improvement, my portable trap will universally recommend itself as being far superior to the complicated and expensive devices now in the market.

To enable others skilled in the art to make and use my invention, I will now proceed to describe its construction and operation.

A is the base of the yard, and consists of a thin circular cast plate or board with a lip or handle-shaped end. *a a* is a series of thin rods or pickets firmly secured in the base. These rods are not seated in a true vertical position, but are slightly inclined, thus making the diameter of the space inclosed less at their upper face than at their base; or these rods may be perfectly vertical, with their outside face inclined. This inclination of the rods enables the spring the more readily to free the noose from the rods when the trap is sprung. These rods are to set so close together that the animal shall not be enabled to pass between them, so as to compel his jumping or springing over the inclosure to gain access to the bait. A' is a rectangular eye or slot cast or otherwise formed in the base. Through this eye A' passes the stud B. This stud is cast or otherwise constructed in a tapering form. Thus, while its narrow end and the main portion of its shank passes freely through the eye, its base or lower end will not. This stud is secured by a pin or anchoring-rod, B', which may be either cast with the stud or be an independent rod, and secured by passing the same through an opening in the stud. C is the trigger or trap-lever, to which is secured the bait-fork C'. This lever C is constructed with a slotted head, which passes over and works freely on the stud B, to which it is firmly connected by the bolt or pin *c*. The advantage of thus connecting the trigger-lever and the stud is, that it securely guards against the animal carrying the lever off with the bait, as frequently is the case in all the latch-traps now in use. *d d* are angular recessed catches cut in the stud B and lever C to secure the latch D when the trap is set. D is the latch, which is of the usual form, and may be constructed of any suitable material, and is provided with a center opening through which passes the cord. This latch D is secured by a cord, E, which is fastened to the spring F. This cord must be of such length as to allow of the forming the noose E', that encircles the rods *a a* when the trap is set, and in which the animal is caught when the trap is sprung. F is an ordinary flat metal-plate spring, and is secured in the eye A' of the base. Of course any other style of spring may be used; or, when a sapling can be procured, the metal spring may be entirely dispensed with and the sapling used in its stead. B' is the pin or rod that secures the stud B to the base A, and also serves to anchor the trap, which is done by staples *b b* or suitable weights placed on the rod.

I propose to construct the different features of my trap by casting the same of any suitable metal; but, of course, if preferred, wood or any other suitable material may be used.

The operation is as follows: The trap is secured at the desired point by driving the staples b b into the ground, or when, owing to the hardness of the surface, this is impracticable, the trap may be secured by placing heavy stones or other weights on the rods B'. The bait is then placed on the fork and the trap set, which is done simply by elevating the depressed or forked end of the trigger or lever C and securing the latch D in the catches d d of the stud B and trigger C. The noose E' at the end of the cord E is then opened and passed over the rods a a. The entire trap is now in position, as shown in Fig. 1, and so remains until the lever C is depressed, as the same is now securely held by the tension of the spring F acting through the cord E and latch D. The rods a a being placed so close together as to prevent the animal passing between them in order to gain access to the bait, he is compelled to jump or spring over the rods. This brings a portion, if not his entire body, within the inclosure of the base, and also, of course, into the extended noose E'. The moment the bait is touched the trigger C is depressed, which frees the latch D, when the entire tension or power of the spring is instantly exerted to elevate the cord E, its noose E' easily, owing to their inclined position, slipping off the rods a a and being tightened around the animal, who is thus caught and securely held until such time as it may be desired to release him.

Having thus fully described my invention, what I claim therein as new, and desire to secure by Letters Patent of the United States, is—

1. The base A, rods a a, stud B, and trigger C when permanently attached, as shown, latch D, cord E, and spring F, when the same are so combined and arranged as to furnish a trap, substantially as described.

2. Anchoring the trap by means of a rod, B, and staples b b, or their equivalents, substantially as described.

In testimony whereof I have signed my name to this specification in the presence of two subscribing witnesses.

WM. W. BRIGG.

Witnesses:
EDWIN JAMES,
JOS. T. K. PLANT.